(12) United States Patent
Cleveland et al.

(10) Patent No.: US 8,957,651 B2
(45) Date of Patent: Feb. 17, 2015

(54) USER-CONFIGURABLE, EFFICIENCY-OPTIMIZING, POWER/ENERGY CONVERSION SWITCH-MODE POWER SUPPLY WITH A SERIAL COMMUNICATIONS INTERFACE

(75) Inventors: Terry Cleveland, Endicott, NY (US); Clifford Ellison, III, Campbell, NY (US); Scott Dearborn, Brackney, PA (US); Keith Pazul, Tempe, AZ (US)

(73) Assignee: Microchip Technology Incorporated, Chandler, AZ (US)

( * ) Notice: Subject to any disclaimer, the term of this patent is extended or adjusted under 35 U.S.C. 154(b) by 902 days.

(21) Appl. No.: 13/159,090

(22) Filed: Jun. 13, 2011

(65) Prior Publication Data

US 2012/0139518 A1 Jun. 7, 2012

Related U.S. Application Data

(60) Provisional application No. 61/420,090, filed on Dec. 6, 2010.

(51) Int. Cl.
*G05F 1/56* (2006.01)
*H02M 3/157* (2006.01)

(52) U.S. Cl.
CPC .................................. *H02M 3/157* (2013.01)
USPC ......................................... 323/283; 323/351

(58) Field of Classification Search
USPC .................... 323/224, 282–285, 351
See application file for complete search history.

(56) References Cited

U.S. PATENT DOCUMENTS

| | | | |
|---|---|---|---|
| 5,914,870 A | 6/1999 | Noble et al. | 363/84 |
| 5,955,872 A | 9/1999 | Grimm | 323/283 |
| 5,959,443 A | 9/1999 | Littlefield | 323/287 |
| 6,400,127 B1 | 6/2002 | Giannopoulos | 323/283 |
| 6,724,175 B1 | 4/2004 | Matsuda et al. | 323/283 |
| 7,230,408 B1* | 6/2007 | Vinn et al. | 323/273 |
| 7,436,158 B2 | 10/2008 | Huang et al. | 323/224 |
| 7,463,011 B2 | 12/2008 | Sharma | 323/283 |
| 7,592,791 B2 | 9/2009 | Emira | 323/283 |

(Continued)

FOREIGN PATENT DOCUMENTS

WO 2005/079227 A2 9/2005

OTHER PUBLICATIONS

International PCT Search Report and Written Opinion, PCT/US2011/062786, 11 pages, Apr. 2, 2012.

(Continued)

*Primary Examiner* — Adolf Berhane
*Assistant Examiner* — Nusrat Quddus
(74) *Attorney, Agent, or Firm* — King & Spalding L.L.P.

(57) ABSTRACT

An intelligent pulse width modulation (PWM) controller adapts a switch mode power supply (SMPS) system's operating parameters to optimize efficiency, remove hot spots and isolate faults by integrating a microcontroller, PWM digital circuits and analog circuits into a single integrated circuit, thereby reducing the number of external connections, silicon die area and integrated circuit packages. A communications interface is used to communicate with a host system for monitoring operating parameters of the SMPS, e.g., current, voltage, efficiency, operating temperature, diagnostics, etc. In addition, the communications interface may be used to alter the operating parameters (objectives) of the SMPS during operation thereof.

17 Claims, 12 Drawing Sheets

(56) References Cited

U.S. PATENT DOCUMENTS

| | | | |
|---|---|---|---|
| 7,719,251 B2 | 5/2010 | Qahouq et al. | 323/286 |
| 7,825,642 B1 | 11/2010 | Young et al. | 323/224 |
| 7,888,918 B2 | 2/2011 | Wu et al. | 323/224 |
| 7,906,939 B2 * | 3/2011 | Kung et al. | 320/128 |
| 7,923,794 B2 | 4/2011 | Feyh | 257/415 |
| 7,948,720 B2 | 5/2011 | Mok et al. | 361/18 |
| 8,120,335 B2 | 2/2012 | Caldwell | 323/224 |
| 8,179,105 B2 | 5/2012 | Lipcsei | 323/224 |
| 8,339,113 B2 * | 12/2012 | Dearborn | 323/222 |
| 8,344,712 B2 | 1/2013 | Martin et al. | 323/272 |
| 8,427,123 B2 * | 4/2013 | Dearborn | 323/282 |
| 2002/0144163 A1 | 10/2002 | Goodfellow et al. | 713/300 |
| 2004/0046535 A1 | 3/2004 | Duffy et al. | 323/283 |
| 2004/0232898 A1 | 11/2004 | Morris et al. | 323/282 |
| 2005/0007086 A1 * | 1/2005 | Morimoto | 323/282 |
| 2006/0033483 A1 * | 2/2006 | Wu | 323/282 |
| 2007/0159151 A1 * | 7/2007 | Katoh et al. | 323/285 |
| 2007/0236281 A1 | 10/2007 | Cicalini | 327/553 |
| 2007/0236287 A1 | 10/2007 | Bernacchia et al. | 330/10 |
| 2007/0257647 A1 * | 11/2007 | Chen et al. | 323/282 |
| 2007/0262802 A1 | 11/2007 | Huard et al. | 327/172 |
| 2008/0180078 A1 * | 7/2008 | Hiasa | 323/282 |
| 2008/0225563 A1 * | 9/2008 | Seo | 363/123 |
| 2008/0284388 A1 | 11/2008 | Oettinger et al. | 323/234 |
| 2009/0096533 A1 | 4/2009 | Paul et al. | 330/305 |
| 2009/0146634 A1 | 6/2009 | Audy | 323/290 |
| 2010/0079127 A1 | 4/2010 | Grant | 323/285 |
| 2011/0006744 A1 * | 1/2011 | Dearborn | 323/282 |
| 2011/0187340 A1 * | 8/2011 | Deval et al. | 323/285 |
| 2012/0133347 A1 * | 5/2012 | Cleveland et al. | 323/283 |
| 2012/0139517 A1 * | 6/2012 | Cleveland et al. | 323/283 |
| 2012/0139519 A1 * | 6/2012 | Dearborn | 323/290 |
| 2012/0169308 A1 * | 7/2012 | Dearborn et al. | 323/271 |
| 2012/0169310 A1 * | 7/2012 | Dearborn et al. | 323/271 |
| 2013/0119875 A1 * | 5/2013 | Dearborn et al. | 315/186 |

OTHER PUBLICATIONS

International PCT Search Report and Written Opinion, PCT/US2011/062784, 11 pages, May 29, 2012.
International PCT Search Report and Written Opinion, PCT/US2011/061599, 12 pages, Oct. 29, 2012.

* cited by examiner

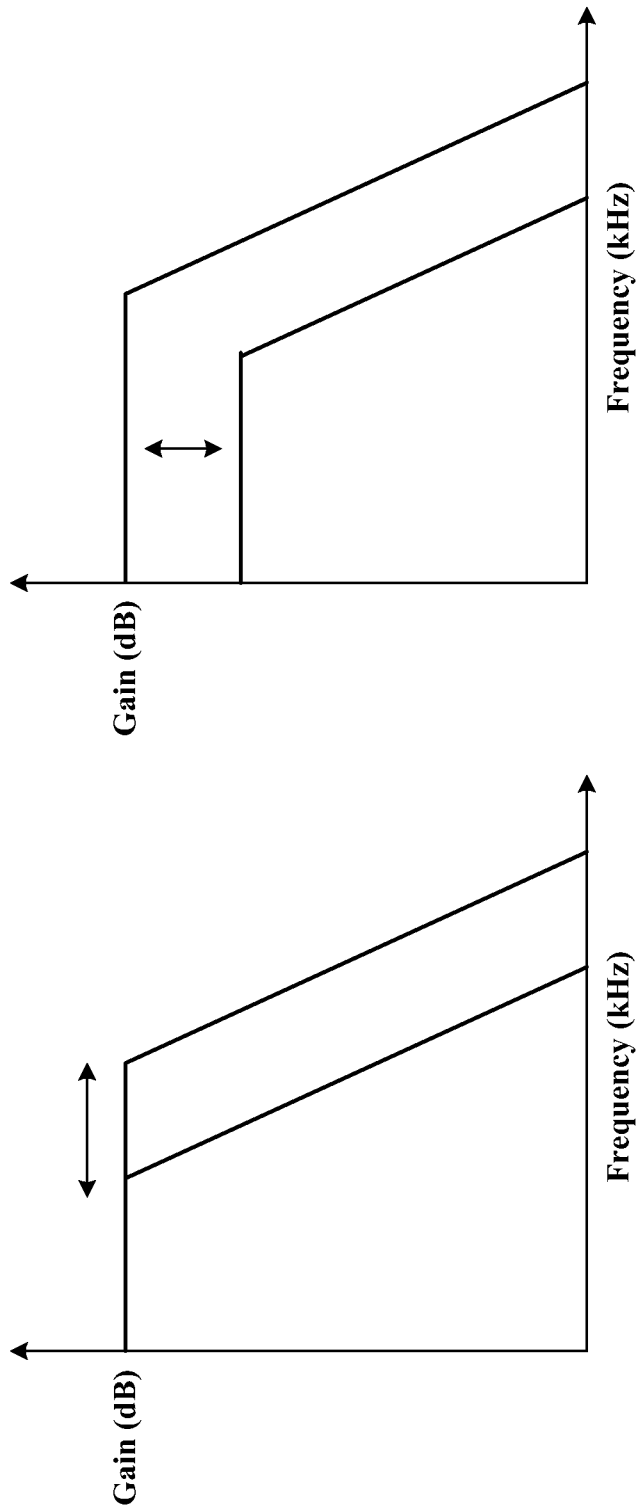

US 8,957,651 B2

USER-CONFIGURABLE, EFFICIENCY-OPTIMIZING, POWER/ENERGY CONVERSION SWITCH-MODE POWER SUPPLY WITH A SERIAL COMMUNICATIONS INTERFACE

RELATED PATENT APPLICATIONS

This application claims priority to commonly owned U.S. Provisional Patent Application Ser. No. 61/420,090; filed Dec. 6, 2010; and is related to commonly owned U.S. patent application Ser. No. 12/959,837; filed Dec. 3, 2010; U.S. patent application Ser. No. 13/158.874; filed Jun. 13, 2011; and U.S. patent application Ser. No. 13/159,000; filed Jun. 13, 2011; all of which are hereby incorporated by reference herein for all purposes.

TECHNICAL FIELD

The present disclosure relates to switch mode power supplies, and, more particularly, to efficiency-optimizing, calibrated sensorless power/energy conversion in a switch-mode power supply (SMPS).

BACKGROUND

The synchronous buck switch-mode power converter is a commonly used topology for switch-mode power supply (SMPS) applications. The SMPS topology is gaining wider acceptance because of its high efficiency, small size and light weight. However, as the size of an SMPS is decreased, heat dissipation/removal therefrom becomes more problematic. Even though the typical efficiency of an SMPS may be 90 percent, there still remains 10 percent of the energy used by the SMPS becoming wasted heat. In addition, the high efficiency of the SMPS is optimized for only a single load condition. However, in real world applications power utilization loads vary over a wide range, and so do the associated SMPS efficiencies at those loads. Current sensing in the SMPS topology can be challenging and must be overcome in design. Knowing or monitoring the current being injected into the load provides protection for the power converter and can improve dynamic performance during closed loop control thereof.

Inductors in the SMPS are used to store energy during a portion of the switching cycle. The electrical characteristics, e.g., inductance and magnetic saturation values, of the SMPS inductor may vary widely. The tolerance of the inductor characteristics varies with temperature and/or voltage, so SMPS systems must be "over-designed" to optimize SMPS system efficiency for worst case conditions. Also, accurate measurement of the inductor current from one SMPS to another and at different load currents becomes problematic. Having the ability to accurately calibrate inductor current sense circuits associated with the inductors of a multiphase SMPS system would improve the dynamic performance and eliminate hot spots for the multiple phase converters of the multiphase SMPS system. In addition, having the ability to communicate with the SMPS system allows for operating parameters to be monitored, diagnostics to be performed, and operating objectives to be altered.

SUMMARY

Therefore a need exists for a higher performance power/energy conversion switch-mode power supply (SMPS) that maintains improved efficiencies for substantially all load conditions, and is able to communicate with a host system so that operating parameters can be monitored, diagnostics can be performed, and operating objectives can be altered in the SMPS. This may be accomplished with an intelligent pulse width modulation (PWM) controller that adapts the SMPS system operating parameters to optimize efficiency, remove hot spots and isolate faults by integrating a microcontroller, a serial communications interface, PWM digital circuits and analog circuits into a single integrated circuit, thereby reducing the number of external connections, silicon die area and integrated circuit packages then have been required by prior technology SMPS systems. Thereby allowing smaller printed circuit board space and fewer external components that result in lower cost to manufacture and improved reliability and flexibility of the SMPS system.

These improved efficiencies available for substantially all load conditions may be achieved by combining intelligent control and the use of pulse width modulation (PWM) with calibrated sensorless feedback techniques more fully described hereinafter. According to the teachings of this disclosure, the intelligent SMPS controller may be programmed to optimize SMPS efficiencies for all operating parameters, e.g., switching frequencies, delay time between switches, drive capabilities, etc., over substantially all load conditions of the SMPS. Being able to communicate with the SMPS system allows for operating parameters to be monitored, diagnostics to be performed, and operating objectives to be altered.

According to a specific example embodiment of this disclosure, a switch-mode power supply (SMPS) comprises: at least one power switch coupled to a voltage source; a power inductor coupled to the at least one power switch; a filter capacitor coupled to a load side of the power inductor that provides a regulated voltage output of the SMPS; and a SMPS controller coupled to the voltage source, the at least one power switch, the power inductor and the regulated voltage output of the SMPS, wherein the SMPS controller comprises: at least one driver coupled to the at least one power switch; a pulse width modulation (PWM) generator having an output coupled to and controlling the at least one driver; a digital processor having a memory, the digital processor is coupled to and provides operating parameters to the PWM generator during operation thereof; a voltage comparison circuit for comparing the regulated output voltage to a reference voltage, wherein the voltage comparison circuit generates an error signal representative of a difference between the regulated output voltage and the reference voltage, and wherein the error signal is coupled to an error input of the PWM generator; a power inductor current measurement circuit, wherein the power inductor current measurement circuit provides a voltage output to the digital processor that is representative of the current flowing through the power inductor, and a communications interface coupled to the digital processor for providing user-configurable operating parameters to the SMPS; wherein the digital processor optimizes operation of the SMPS by providing operating parameters to the SMPS controller for all operating conditions of the SMPS.

According to another specific example embodiment of this disclosure, a method for user-configurable optimization of a switch-mode power supply (SMPS) operation comprises the steps of: providing at least one power switch coupled to a voltage source; providing a power inductor coupled to the at least one power switch; providing a filter capacitor coupled to a load side of the power inductor that provides a regulated voltage from the SMPS; and providing a SMPS controller, wherein the SMPS controller facilitates: coupling at least one driver to the at least one power switch, controlling the at least one driver with a pulse width modulation (PWM) generator, comparing the regulated voltage from the SMPS to a reference voltage with a voltage comparison circuit, generating a voltage error signal representative of a difference between the regulated voltage and the reference voltage with the voltage comparison circuit, coupling the voltage error signal to the PWM generator, measuring current through the power inductor; providing a current output signal representative of the current flowing through the power inductor, providing a digital processor having a memory, wherein the voltage error signal and the current output signal are coupled to inputs of the digital processor and the digital processor controls the PWM generator for adjusting operating parameters based upon the current output and voltage error signals; and providing a communications interface coupled to the digital processor for supplying user-configurable operating parameters to the SMPS.

BRIEF DESCRIPTION OF THE DRAWINGS

A more complete understanding of the present disclosure thereof may be acquired by referring to the following description taken in conjunction with the accompanying drawings wherein:

FIG. 7 illustrates a graph of pole frequency adjustments for the circuits shown in FIGS. 5 and 6;

FIG. 8 illustrates a graph of DC gain adjustments for the circuits shown in FIGS. 5 and 6;

Figure 2:
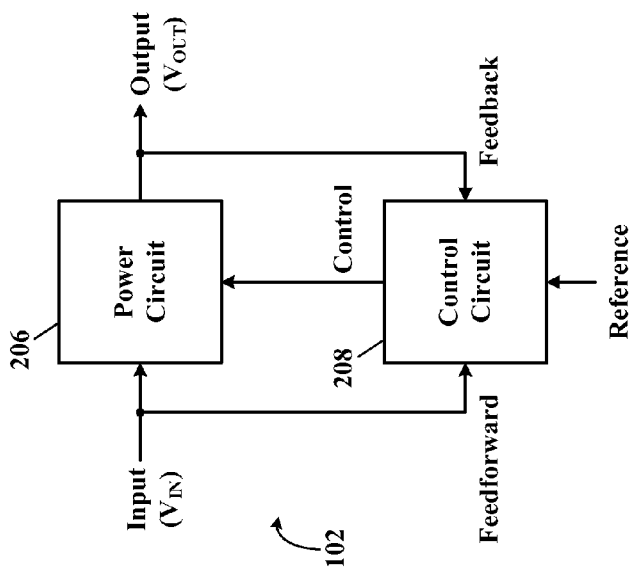
FIG. 2 illustrates a more detailed schematic block diagram of the voltage regulator system shown in FIG. 1.

While the present disclosure is susceptible to various modifications and alternative forms, specific example embodiments thereof have been shown in the drawings and are herein described in detail. It should be understood, however, that the description herein of specific example embodiments is not intended to limit the disclosure to the particular forms disclosed herein, but on the contrary, this disclosure is to cover all modifications and equivalents as defined by the appended claims.

DETAILED DESCRIPTION

Referring now to the drawing, the details of specific example embodiments are schematically illustrated. Like elements in the drawings will be represented by like numbers, and similar elements will be represented by like numbers with a different lower case letter suffix.

In a general sense, a power converter can be defined as a device which converts one form of energy into another on a continuous basis. Any storage or loss of energy within such a power system while it is performing its conversion function is usually identical to the process of energy translation. There are many types of devices which can provide such a function with varying degrees of cost, reliability, complexity, and efficiency.

The mechanisms for power conversion can take many basic forms, such as those which are mechanical, electrical, or chemical processing in nature. The focus herein will be on power converters which perform energy translation electrically and in a dynamic fashion, employing a restricted set of components which include inductors, capacitors, transformers, switches and resistors. How these circuit components are connected is determined by the desired power translation. Resistors introduce undesirable power loss. Since high efficiency is usually an overriding requirement in most applications, resistive circuit elements should be avoided or minimized in a main power control path. Only on rare occasions and for very specific reasons are power consuming resistances introduced into the main power control path. In auxiliary circuits, such as sequence, monitor, and control electronics of total system, high value resistors are common place, since their loss contributions are usually insignificant.

Figure 1:
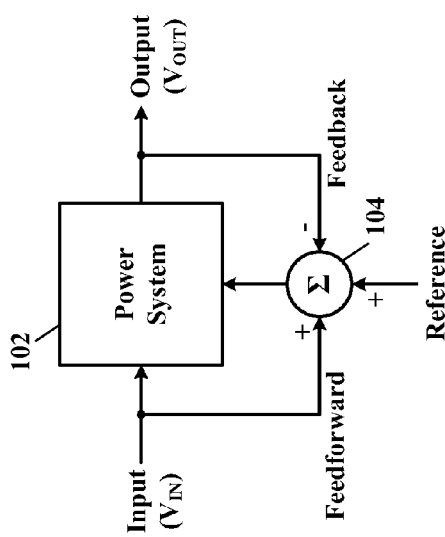
FIG. 1 illustrates a schematic block diagram of a basic voltage regulator system.

Referring to FIG. 1, depicted is a schematic block diagram of a basic voltage regulator system. A power system 102, e.g., a basic switch-mode power converter where an input of an uncontrolled source of voltage (or current, or power) is applied to the input of the power system 102 with the expectation that the voltage (or current, or power) at the output will be very well controlled. The basis of controlling the output is to compare it to some form of reference, and any deviation between the output and the reference becomes an error. In a feedback-controlled system, negative feedback is used to reduce this error to an acceptable value, as close to zero as is required by the system. It is desirable, typically, to reduce the error quickly, but inherent with feedback control is the trade-off between system response and system stability. The more responsive the feedback network is, the greater becomes the risk of instability.

At this point, it should be mentioned that there is another method of control—feed forward. With feed forward control, a control signal is developed directly in response to an input variation or perturbation. Feed forward is less accurate than feedback since output sensing is not involved, however, there is no delay waiting for an output error signal to be developed, and feed forward control cannot cause instability. It should be clear that feed forward control typically is not adequate as the only control method for a voltage regulator, but it is often used together with feedback to improve a regulator's response to dynamic input variations.

Referring to FIG. 2, depicted is a more detailed schematic block diagram of the voltage regulator system shown in FIG. 1. The power system 102 has been separated into two blocks: the power circuit 206 and the control circuit 208. The power circuit 206 handles the power system load current and is typically large, robust, and subject to wide temperature fluctuations. Its switching functions are by definition, large-signal phenomenon, normally simulated in most stability analyses as just a two-state switch with a duty cycle. The output filter (not shown) is also considered as a part of the power circuit 206, but can be considered as a linear block. The control circuit 208 will normally be made up of a gain block, an error amplifier, and a pulse-width modulator, used to define the duty cycle for the power switches. According to the teachings of this disclosure, the control circuit 208 is optimized to respond to disturbances in the power system 102 while maintaining a desired output voltage, $V_{OUT}$.

Figure 3:
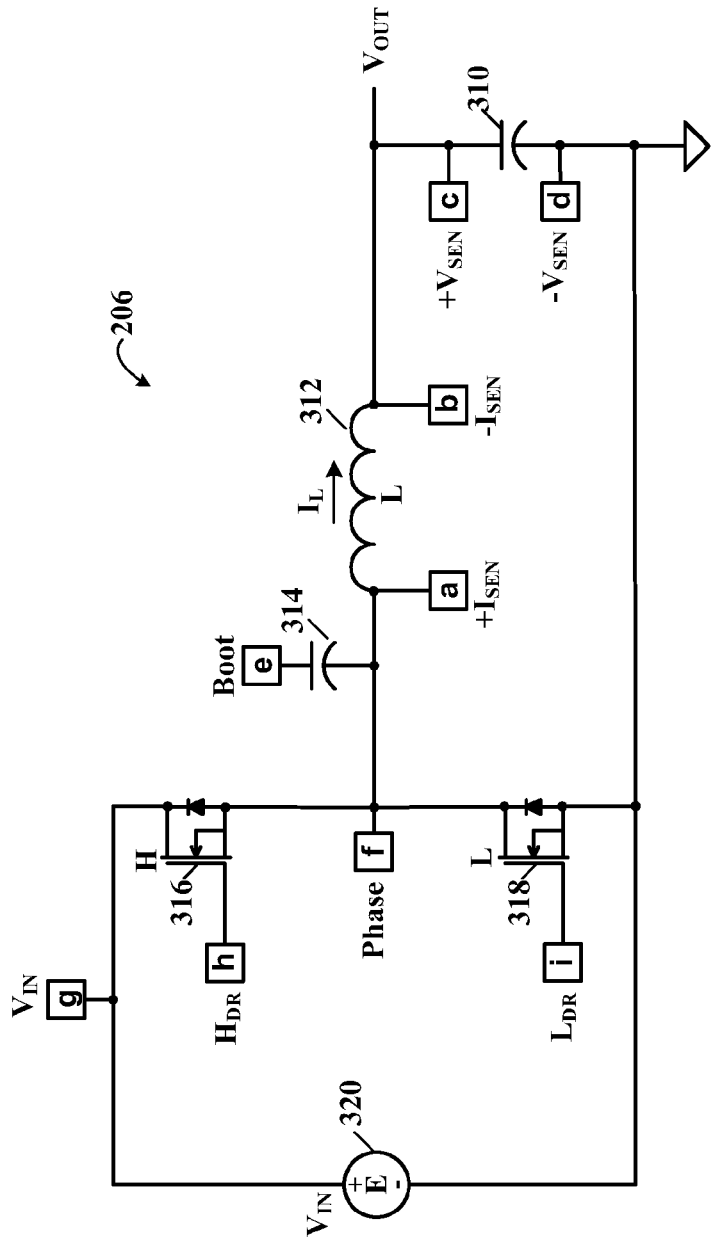
FIG. 3 illustrates a schematic diagram of the power circuit shown in FIG. 2 implemented as a switch-mode power supply (SMPS), according to a specific example embodiment of this disclosure.

Referring to FIG. 3, depicted is a schematic diagram of the power circuit shown in FIG. 2 implemented as a switch-mode power supply (SMPS), according to a specific example embodiment of this disclosure. The power circuit 206 of the SMPS may comprise a power source 320, e.g., battery, a power inductor 312, high and low switches 316 and 318, respectively, e.g., power field effect transistors; a load capacitor 310 for smoothing alternating current (AC) ripple from the desired direct current (DC) output, and a boot voltage capacitor 314. The power circuit 206 is connected to and controlled by the control circuit 208 as shown in FIG. 4 and more fully described hereinafter.

Figure 4:
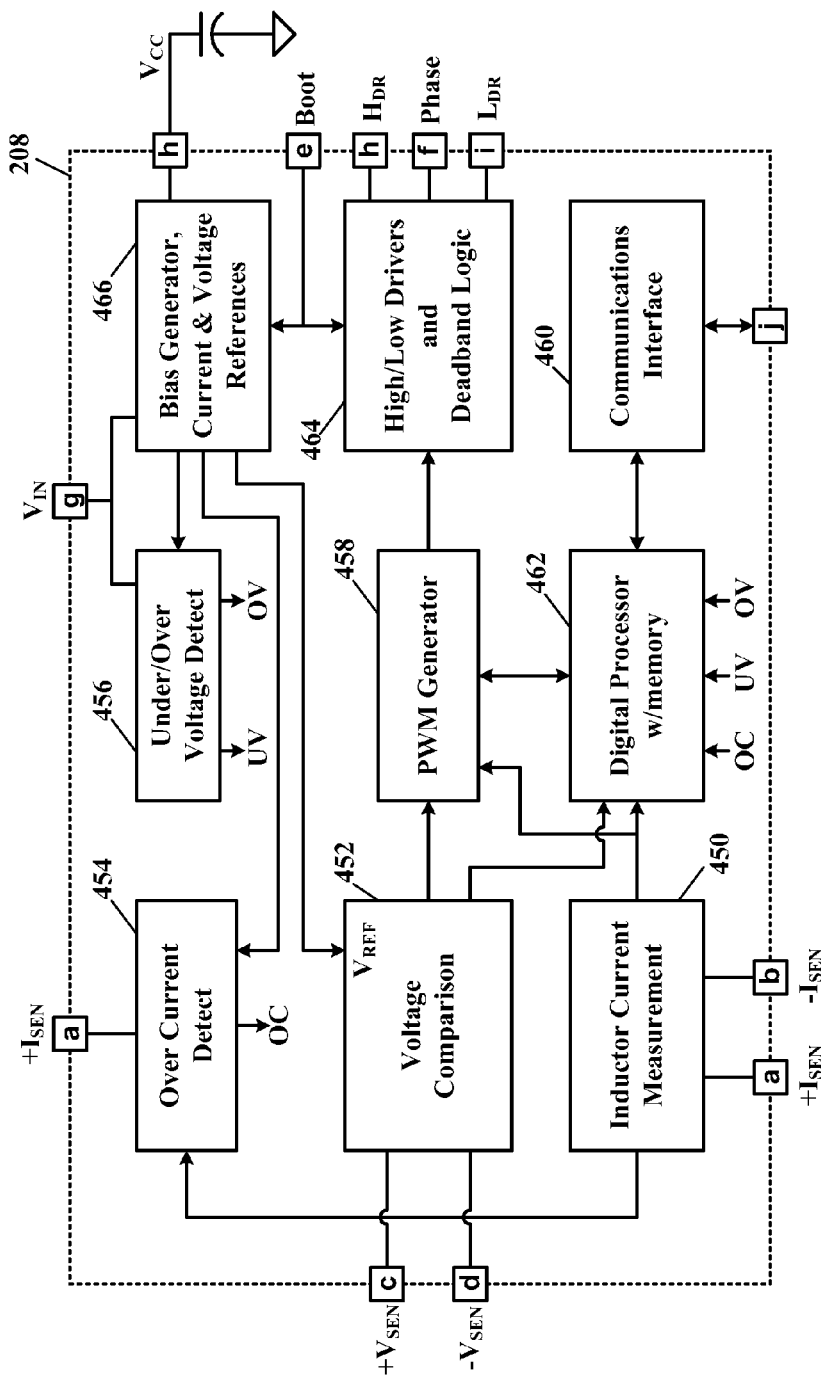
FIG. 4 illustrates a more detailed schematic block diagram of the control circuit shown in FIG. 2, according to the specific example embodiment of this disclosure.

Referring to FIG. 4, depicted is a more detailed schematic block diagram of the control circuit shown in FIG. 2, according to the specific example embodiment of this disclosure. The control circuit 208 is connected to the power circuit 206 shown in FIG. 3 and comprises a digital processor with memory 462, e.g., microcontroller; high and low switch drivers having deadband logic represented by function block 464, bias generator, current and voltage reference circuits 466; under and over voltage detectors 456, a PWM generator 458, an over current detector 454, a voltage comparison circuit 452, a sensorless inductor current measurement circuit 450, and a communications interface 460. The PWM generator 458 may be of either an analog or digital design for supplying PWM control pulses to the high and low switch drivers 464.

The high and low switch drivers of the function block 464 are coupled to and control when the high and low switches 316 and 318 turn on and off. In addition the deadband logic of the function block 464 prevent the high and low switches 316 and 318 from ever being on at the same time, preferably, there is a deadband where both of the high and low switches 316 and 318 are off. The PWM generator 458 controls when and for how long the power inductor 312 is coupled to and being charged by the power source 320.

The boot voltage capacitor 314 supplies power to the high side portion of the switch driver 464; and the bias generator, current and voltage reference circuits 466. The bias generator, current and voltage reference circuits 466 supply precision current and voltage reference values to the current and voltage circuits 452, 454 and 456. The voltage comparison circuit 452 measures the output voltage and compares it to a reference voltage, $V_{REF}$, from the voltage reference circuit 466. An error signal from the voltage comparison circuit 452, representing the difference between a desired voltage value and the actual output voltage value, is applied to an error input of the PWM generator 458, wherein the PWM generator 458 adjusts its pulse waveform output to minimize that difference (closed loop feedback, see FIG. 1). The over current detector 454 monitors the current to the power inductor 312, and the under and over voltage detectors 456 monitor the input voltage to the SMPS for undesirable e.g., abnormal, conditions, e.g., inductor current exceeds allowable design limits, input voltage is above or below a design operating input voltage range. The power inductor current measurement circuit 450 measures SMPS power inductor current. It is contemplated and within the scope of this disclosure that any method and/or circuit for measuring current through the power inductor 312 may be used, and one having ordinary skill in the design of SMPS systems and having the benefit of this disclosure would understand how to implement such a current measurement circuit. Various inductor current measurement circuits are more fully described in commonly owned U.S. patent application Ser. No. 12/959,837, by Scott Dearborn, filed Dec. 3, 2010, and is incorporated by reference herein for all purposes.

Figure 5:
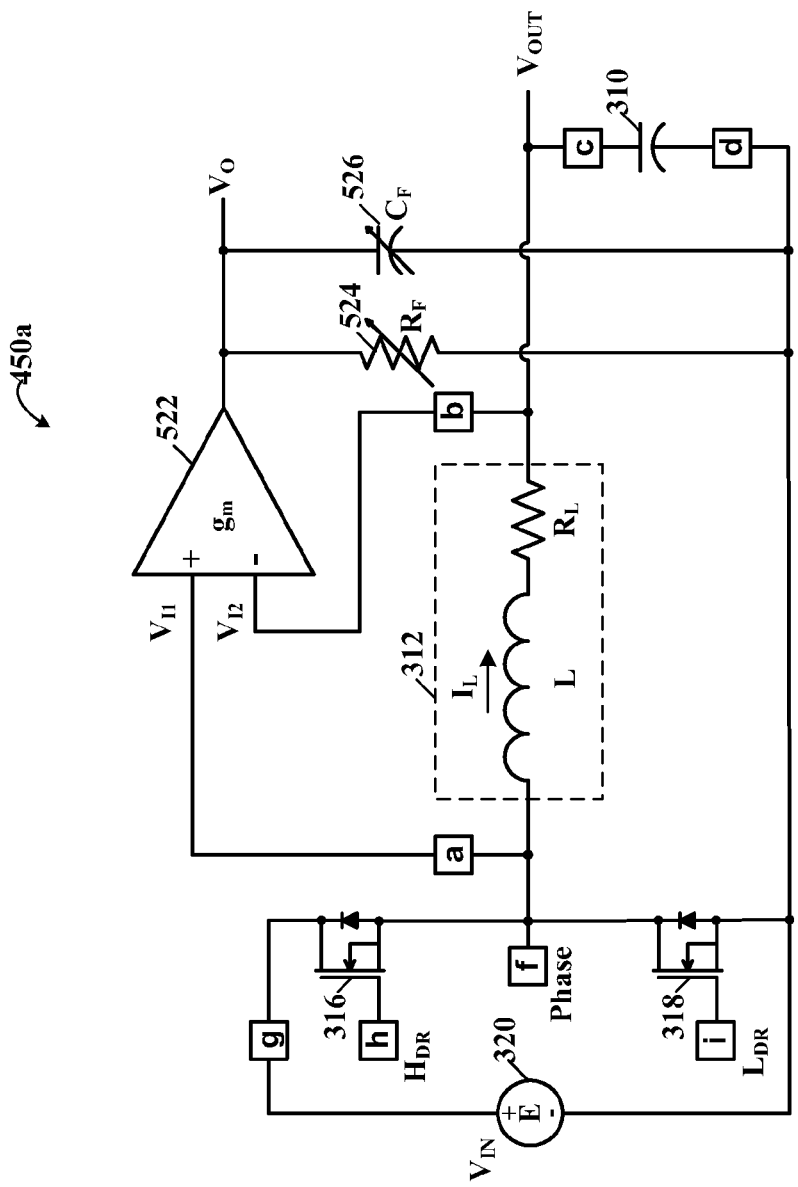
FIG. 5 illustrates a schematic diagram of a circuit for losslessly measuring inductor current of a SMPS, according to a specific example embodiment of this disclosure.
Figure 6:
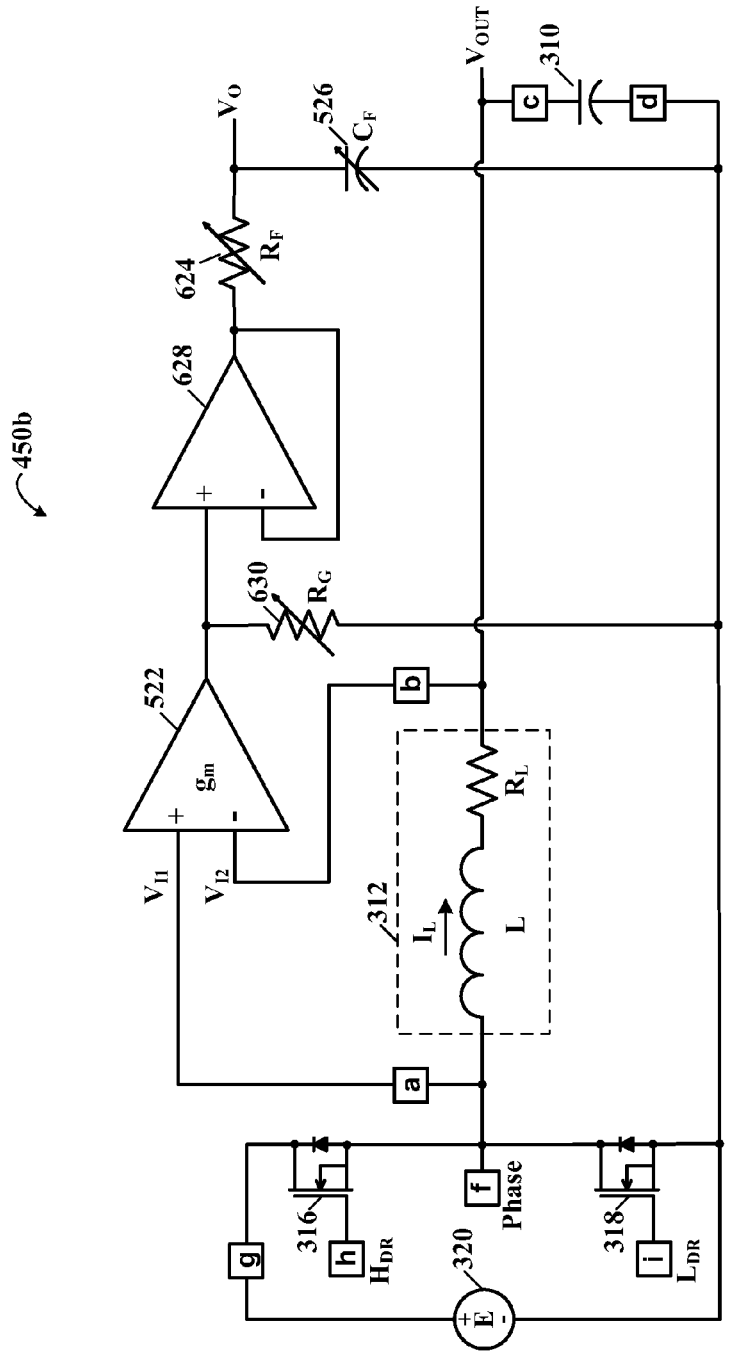
FIG. 6 illustrates a schematic diagram of a circuit for losslessly measuring inductor current of a SMPS, according to another specific example embodiment of this disclosure.

Sensorless inductor current measurement circuits 450a and 450b may be used to measure the current through the power inductor 312, as shown in FIGS. 5 and 6. respectively, and more fully described hereinafter. The sensorless inductor current measurement circuit 450a may be implemented as a matched complimentary filter by utilizing a tunable filter comprising an operational transconductance amplifier (OTA), a variable resistor and a variable capacitor in one specific example embodiment (FIG. 5). In another specific example embodiment of the sensorless inductor current measurement circuit 450b, an operational amplifier, configured as a buffer, and a variable resistor have been added, providing independent gain and pole location adjustment (FIG. 6). The communications interface 460 may be used to communicate with a host system for monitoring operating parameters of the SMPS, e.g., current, voltage, efficiency, operating temperature, diagnostics, etc. In addition, the communications interface 460 may be used to alter the operating parameters (objectives) of the SMPS during operation thereof.

Referring to FIG. 5, depicted is a schematic diagram of a circuit for losslessly measuring the power inductor current of the SMPS, according to a specific example embodiment of this disclosure. A tunable complimentary filter inductor current measuring circuit comprises an operational transconductance amplifier (OTA) 522, a variable resistor 524, and a variable capacitor 526. The OTA 522 is configured as a voltage variable integrator and is used as a first-order low-pass filter (see FIGS. 7 and 8). The transfer function for this integrator is:

$$V_O/(V_{I1}-V_{I2})=g_m/(s*C_F)$$

The OTA 522 circuit shown in FIG. 5 has an adjustable pole frequency, and adjustable DC gain. The pole frequency is adjusted by the capacitor 526, $C_F$, and resistor 524, $R_F$; and the DC gain is adjusted by the resistor 524, $R_F$. The transfer function of the filter shown in FIG. 5 is represented by:

$$V_O/(V_{I1}-V_{I2})=(g_m*R_F)/(s*R_F*C_F+1)$$

As noted from the transfer function, the DC gain is equal to $g_m*R_F$; and the pole frequency is equal to $1/(2\pi*R_F*C_F)$ Hz. The pole frequency and DC gain can not be adjusted independently.

Referring to FIG. 6, depicted is a schematic diagram of a circuit for losslessly measuring the power inductor current of the SMPS, according to another specific example embodiment of this disclosure. A tunable complimentary filter inductor current measuring circuit comprises an operational transconductance amplifier (OTA) 522, a variable resistor 624, an operational amplifier 628 configured as a buffer, a variable resistor 630, and a variable capacitor 526. The OTA 522 is configured as a voltage variable input gain stage with a wide bandwidth. The operational amplifier 628 decouples the input gain stage from the single pole, low pass filter. The pole frequency can be adjusted by changing the resistor 624, $R_F$, and/or the capacitor 526, $C_F$, and the DC gain can be subsequently adjusted by changing the variable resistor 630, $R_G$. The transfer function of the filter shown in FIG. 6 is represented by:

$$V_O/(V_{I1}-V_{I2})=(g_m*R_G)/(s*R_F*C_F+1)$$

As noted from the transfer function, the DC gain is equal to $g_m*R_G$; and the pole frequency is equal to $1/(2\pi*R_F*C_F)$ Hz. The pole frequency and DC gain can be adjusted independently.

The tunable complimentary filters shown in FIGS. 5 and 6 can be adjusted, e.g., tuned, to match the $L/R_L$ zero, and gain adjusted to amplify the sensed current signal to a desired voltage level. The tunable complimentary filters can further be adjusted in-circuit to significantly reduce the effects of component tolerances. The tunable complimentary filters can be adjusted on the fly in order to adapt to changing operating conditions of the SMPS. The tunable complimentary filters may be used to accurately measure the current through the power inductor 312 for precise closed loop control of the SMPS over all operating conditions so that the SMPS efficiency can be maximized by the digital processor 462 through the PWM generator 458. The sensorless inductor current measurement circuit 450 described hereinabove may also be used to monitor over current through the power inductor, thus taking the place of an eliminating the separate over current detector 454.

The lossless current measurement circuits shown in FIGS. 5 and 6, accurately measure current through the SMPS power inductor 312 without wasting power, are highly accurate over all operating conditions, and are flexible and low in cost to implement in a mixed signal integrated circuit 208 (FIG. 4).

Referring to FIG. 7, depicted is a graph of pole frequency adjustments for the circuits shown in FIGS. 5 and 6.

Referring to FIG. 8, depicted is a graph of DC gain adjustments for the circuits shown in FIGS. 5 and 6.

Figure 9:
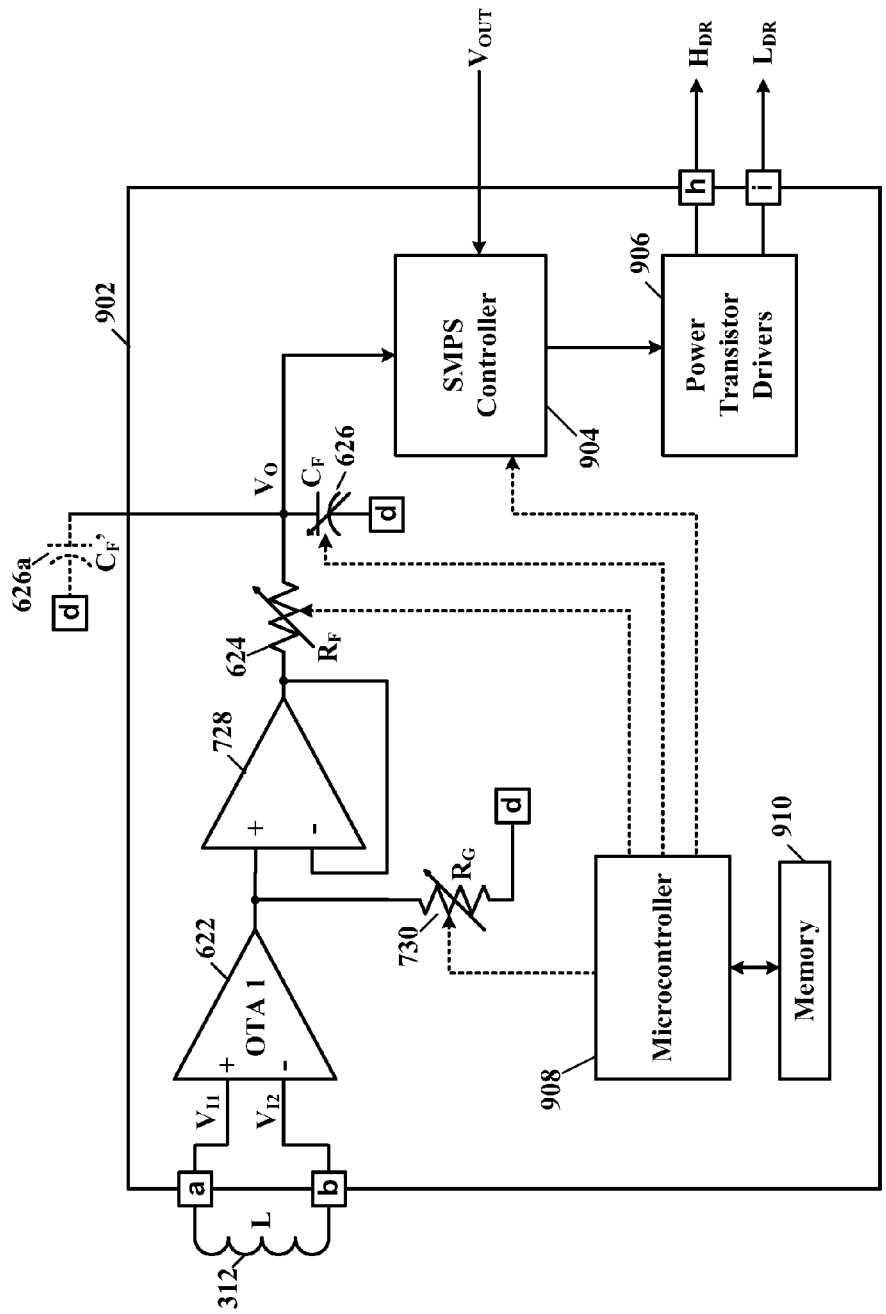
FIG. 9 illustrates a schematic block diagram of a mixed signal integrated circuit device for controlling a SMPS system using the specific example embodiments of the tunable complimentary filters shown in FIGS. 5 and 6.

Referring to FIG. 9, depicted is a schematic block diagram of a mixed signal integrated circuit device for controlling a SMPS system using the specific example embodiments of the tunable complimentary filters shown in FIGS. 5 and 6. The mixed signal integrated circuit device 902 (e.g., in an integrated circuit package having external electrical connections) comprises a SMPS controller 904, power transistor drivers 906 (e.g., function block 464 of FIG. 4), a microcontroller 908 (e.g., digital processor) and associated memory 910 (may be part of the microcontroller 908), an OTA 622, an operational amplifier 728, a DC gain setting resistor 730, a pole frequency setting resistor 624, and a pole frequency setting capacitor 626. The SMPS controller 904 may generate a pulse width modulation (PWM), pulse frequency modulation (PFM), pulse density modulation (PDM), etc., signal for controlling the power transistor drivers 906 that provide the power control signals to the power MOSFET switches 316 and 318 of the SMPS. The SMPS controller 904 monitors the voltage regulated output voltage, $V_{OUT}$, and the measured inductor current signal, $V_O$, from the tunable complimentary filter comprising OTA 622, operational amplifier 728, variable resistors 624 and 730, and tuning capacitor 626.

The OTA 622, operational amplifier 728, variable resistors 624 and 730, and tuning capacitor 626 are connected and operate as more fully described hereinabove. The microcontroller 908 may control the variable resistors 624 and 730, as well as setting parameters for the SMPS controller 904 (dotted lines represent control signals). It is contemplated and within the scope of this disclosure that the microcontroller 908 can perform the same functions as and replace the SMPS controller 904. The microcontroller 908 has analog inputs and analog-to-digital conversion circuits (not shown). An operating program for the mixed signal integrated circuit device 902 may be stored in the memory 910 associated with the microcontroller 908. An additional capacitor 626a may be added external to the mixed signal integrated circuit device 902 and in parallel with the internal capacitor 626. The microcontroller 908 may control the capacitance value of the capacitor 626, and in combination with control of the variable resistors 624 and 730. Control of the capacitor 626 and/or variable resistors 624 and 730 by the microcontroller 908 allows dynamic tuning of the gain and/or pole frequency of the tunable complimentary filter complimentary filter on the fly for optimal current measurement under changing operating conditions of the SMPS. The tunable complimentary filter implementation(s), according to the teachings of this disclosure can also be applied, but is not limited to, switch-mode power converters (e.g., SMPS), brushless dc motors, etc.

Figure 10:
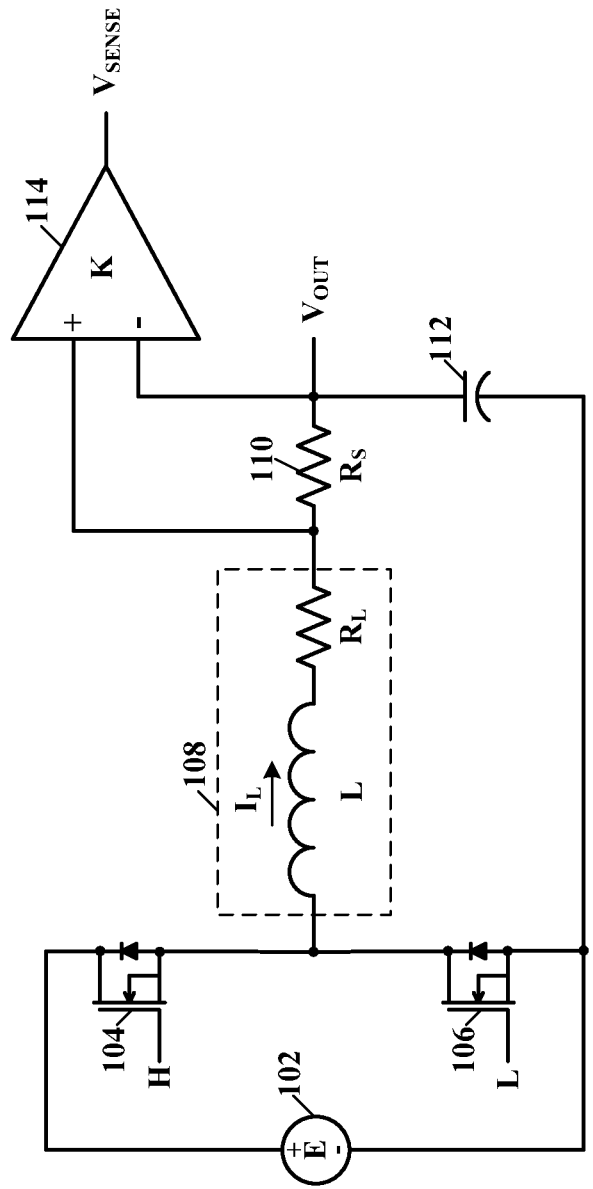
FIG. 10 illustrates a schematic diagram of a circuit for measuring SMPS supplied current to the load, according to yet another specific example embodiment of this disclosure.

Referring to FIG. 10, depicted is a schematic diagram of a circuit for measuring SMPS supplied current to the load, according to yet another specific example embodiment of this disclosure. A series sense resistor 110 is in the main power path of the SMPS. A voltage developed across the series sense resistor 110 is detected by a differential input operational amplifier 114 and a $V_{SENSE}$ output therefrom is proportional to the load current being supplied by the SMPS to the load.

Figure 11:
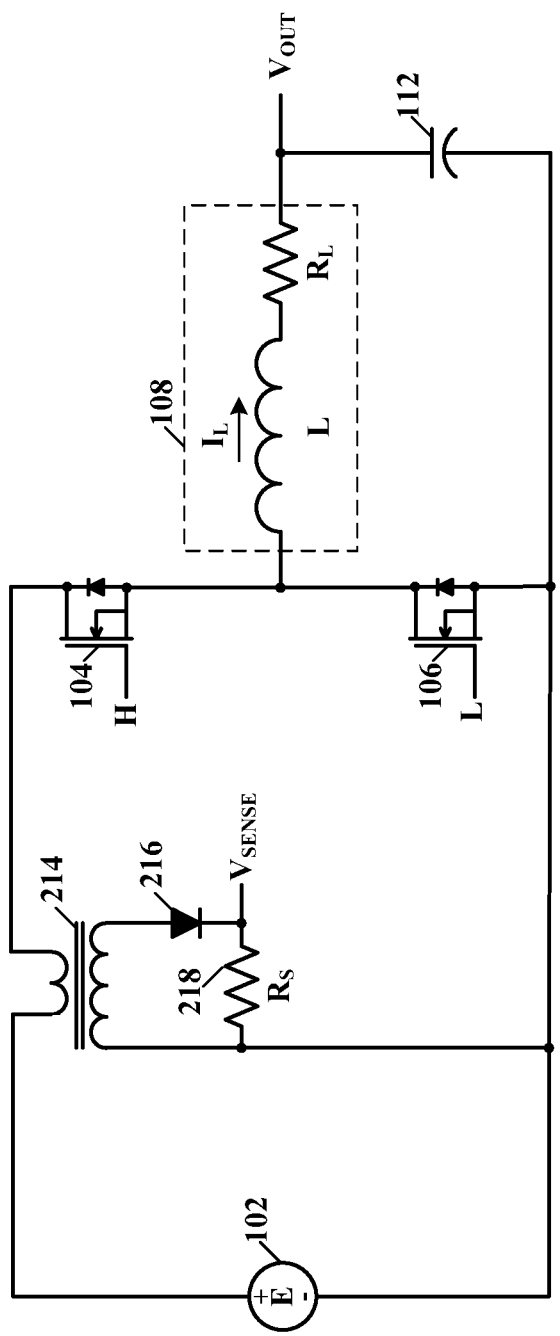
FIG. 11 illustrates a schematic diagram of a circuit for measuring SMPS supplied current to the load, according to still another specific example embodiment of this disclosure.

Referring to FIG. 11, depicted is a schematic diagram of a circuit for measuring SMPS supplied current to the load, according to still another specific example embodiment of this disclosure. A current sense transformer 214 has a primary connected in series with the power path of the SMPS. A sense diode 216 and sense resistor 218 provide a $V_{SENSE}$ output proportional to the load current being supplied by the SMPS. The current sense transformer 214 provides current monitoring for cycle-by-cycle peak current limit and peak current mode control.

Figure 12:
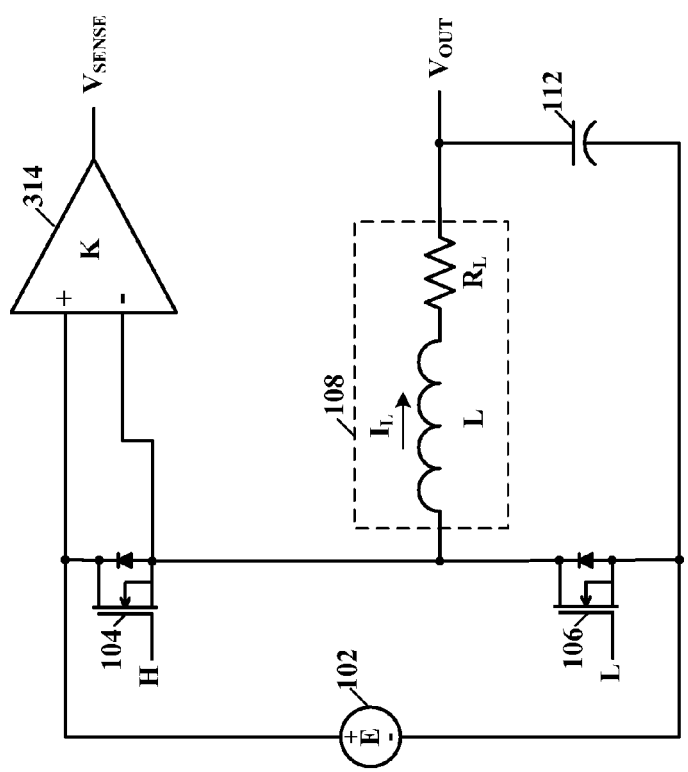
FIG. 12 illustrates a schematic diagram of a circuit for measuring SMPS supplied current to the load by monitoring the on-voltage drop across an upper MOSFET switch, according to another specific example embodiment of this disclosure

Referring to FIG. 12, depicted is a schematic diagram of a circuit for measuring SMPS supplied current to the load by monitoring the on-voltage drop across an upper MOSFET switch, according to another specific example embodiment of this disclosure. Sensing the voltage drop across the upper MOSFET switch 104 when the switch 104 is on provides a lossless signal representative of the current passing through it. A differential input operational amplifier 314 senses the voltage across the MOSFET switch 104 and produces a sense voltage output, $V_{SENSE}$. However, this voltage drop is an inaccurate representation of the load current and is further subject to inaccuracies due to a high temperature coefficient of the MOSFET $R_{DS-ON}$.

Figure 13:
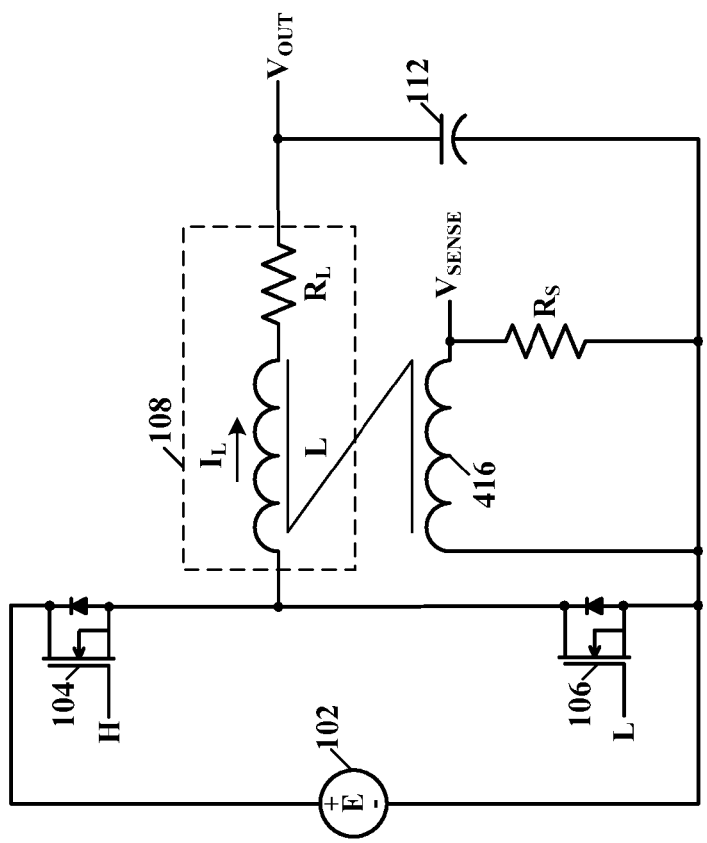
FIG. 13 illustrates a schematic diagram of a circuit for measuring SMPS supplied current to the load with an auxiliary winding on the power inductor, according to yet another specific example embodiment of this disclosure.

Referring to FIG. 13, depicted is a schematic diagram of a circuit for measuring SMPS supplied current to the load with an auxiliary winding on the power inductor, according to yet another specific example embodiment of this disclosure. An inductor voltage integral measurement is obtained by using an auxiliary coil winding 416 on the power inductor 108. By adding the auxiliary coil winding 416 to the power inductor 108, a substantially lossless signal, $V_{SENSE}$, representative of the current passing through the power inductor 108 is provided.

Figure 14:
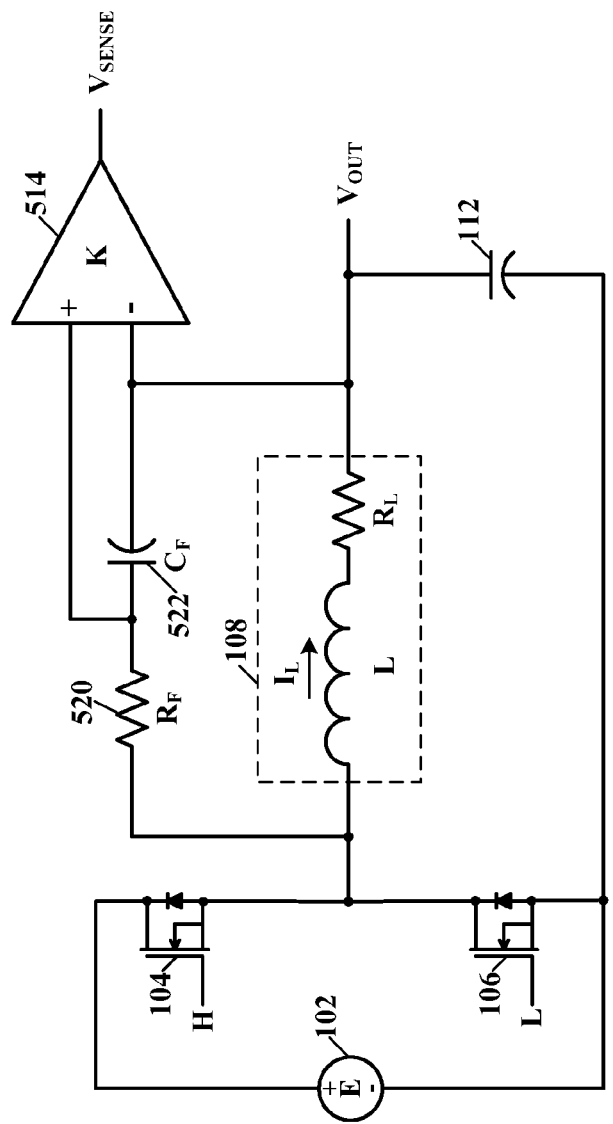
FIG. 14 illustrates a schematic diagram of a circuit for measuring SMPS supplied current to the load by using a matching complimentary filter, according to still another specific example embodiment of this disclosure.

Referring to FIG. 14, depicted is a schematic diagram of a circuit for measuring SMPS supplied current to the load by using a matching complimentary filter, according to still another specific example embodiment of this disclosure. SMPS having a matching complimentary filter for measuring current through the SMPS inductor. The matching complimentary filter measures current through the SMPS inductor 108 by utilizing the inductor coil resistance, $R_L$, of the power inductor 108 to sense the current therethrough. The matching complimentary filter consists of a resistor 520, $R_F$, in series with a small value capacitor 522, $C_F$. This series connected combination is connected in parallel with the inductor 108. When the complimentary filter impedance is matched to the impedance of the power inductor 108, i.e., $L/R_L = R_F * C_F$, the capacitor voltage, $V_{CF}$, is directly proportional to the current through the inductor 108. This is readily shown from the following equations:

$$V_L = I_L * (R_L + s*L)$$

$$V_L = I_L * R_L * (1 + s*(L/R_L))$$

$$V_{CF} = V_L / (1 + s*R_F*C_F)$$

$$V_{CF} = I_L * R_L * [(1 + s*(L/R_L))/(1 + s*R_F*C_F)]$$

if $L/R_L = R_F * C_F$, then $V_{CF} = I_L * R_L$

Where $V_L$ is the voltage across the inductor 108, L is the inductance in henrys of the inductor 108, $R_L$ is the coil resistance in ohms of the inductor 108, $I_L$ is the current in amperes through the inductor 108, and s is the complex frequency in the s-domain (i.e., frequency-domain). Where $V_{CF}$ is the voltage across the matching complimentary filter capacitor 522, $C_F$ is the capacitance in farads of the capacitor 522, and $R_F$ is the resistance in ohms of the matching complimentary filter resistor 520.

The voltage, $V_{CF}$, across the capacitor 522, $C_F$, is applied to the inputs of a differential amplifier 514 and a $V_{SENSE}$ output therefrom is proportional to the load current, $I_L$, being supplied by the SMPS. Measurement of current through the inductor 108 is lossless since no resistor or impedance has been introduced into the high current path of the SMPS. However, this complimentary filter must be matched to the equivalent inductance, L, and series resistance, $R_L$, of the inductor 108 for accurate and absolute current measurement results.

While embodiments of this disclosure have been depicted, described, and are defined by reference to example embodiments of the disclosure, such references do not imply a limitation on the disclosure, and no such limitation is to be inferred. The subject matter disclosed is capable of considerable modification, alteration, and equivalents in form and function, as will occur to those ordinarily skilled in the pertinent art and having the benefit of this disclosure. The depicted and described embodiments of this disclosure are examples only, and are not exhaustive of the scope of the disclosure.

What is claimed is:

1. A switch-mode power supply (SMPS), said SMPS comprising:
    at least one power switch coupled to a voltage source;
    a power inductor coupled to the at least one power switch;
    a filter capacitor coupled to a load side of the power inductor that provides a regulated voltage output of the SMPS; and
    a mixed signal integrated circuit SMPS controller coupled to the voltage source, the at least one power switch, the power inductor and the regulated voltage output of the SMPS, wherein the SMPS controller comprises:
        at least one driver connected to the at least one power switch;
        a bias generator and current and voltage references providing bias voltages for said at least one driver;
        a pulse width modulation (PWM) generator having an output coupled to and controlling the at least one driver;
        a digital processor having a memory, the digital processor is coupled to and provides operating parameters to the PWM generator during operation thereof;
        under/over voltage detector coupled with said digital processor;
        an over current detector coupled with said digital processor;
        a voltage comparison circuit for comparing the regulated output voltage to a reference voltage, wherein the voltage comparison circuit generates an error signal representative of a difference between the regulated output voltage and the reference voltage, and wherein the error signal is coupled to an error input of the PWM generator;
        a power inductor current measurement circuit, wherein the power inductor current measurement circuit provides data to the digital processor that is representative of the current flowing through the power inductor, and
    a communications interface coupled to the digital processor for providing user-configurable operating parameters to the SMPS;
    wherein the digital processor optimizes operation of the SMPS by providing operating parameters to the SMPS controller for all operating conditions of the SMPS.

2. The SMPS according to claim 1, wherein the communications interface further comprises providing monitoring and status of the SMPS to a user.

3. The SMPS according to claim 2, wherein the communications interface is a serial communications interface.

4. The SMPS according to claim 1, wherein the mixed signal integrated circuit SMPS controller is fabricated on an integrated circuit die.

5. The SMPS according to claim 1, wherein the SMPS controller integrated circuit die is packaged in an integrated circuit package having external electrical connections.

6. The SMPS according to claim 1, wherein the power inductor current measurement circuit comprises a series sense resistor in a main power path of the power inductor.

7. The SMPS according to claim 1, wherein the power inductor current measurement circuit comprises a current sense transformer in a main current path of the SMPS.

8. The SMPS according to claim 1, wherein the power inductor current measurement circuit comprises a circuit for measuring voltage drop across an upper MOSFET switch used as the at least one power switch.

9. The SMPS according to claim 1, wherein the power inductor current measurement circuit comprises an auxiliary winding on the power inductor to provide an inductor voltage integral measurement.

10. The SMPS according to claim 1, wherein the power inductor current measurement circuit comprises a matching complementary filter for measuring current through the power inductor.

11. A method for user-configurable optimization of a switch-mode power supply (SMPS) operation, said method comprising the steps of:
    providing at least one power switch coupled to a voltage source;
    providing a power inductor coupled to the at least one power switch;

providing a filter capacitor coupled to a load side of the power inductor that provides a regulated voltage from the SMPS; and providing a mixed signal integrated circuit SMPS controller, wherein the SMPS controller facilitates:

coupling at least one driver to the at least one power switch, providing bias voltages for said at least one driver;

controlling the at least one driver with a pulse width modulation (PWM) generator, comparing the regulated voltage from the SMPS to a reference voltage with a voltage comparison circuit, detecting an under/over voltage and an over current;

generating a voltage error signal representative of a difference between the regulated voltage and the reference voltage with the voltage comparison circuit, coupling the voltage error signal to the PWM generator, measuring current through the power inductor by a power inductor current measurement circuit;

providing a current output signal representative of the current flowing through the power inductor, providing a digital processor having a memory, wherein the voltage error signal and the current output signal are coupled to inputs of the digital processor and the digital processor controls the PWM generator for adjusting operating parameters based upon the current output and voltage error signals and optimizing operation of the SMPS for all operating conditions thereof; and providing a communications interface coupled to the digital processor for supplying user-configurable operating parameters to the SMPS.

12. The method according to claim 11, further comprising the step of providing monitoring and status of the SMPS to a user with the communications interface.

13. The method according to claim 11, wherein the step of measuring current through the power inductor comprises the step of measuring a voltage across a series sense resistor in a main power path of the power inductor, wherein the voltage is proportional to the current through the power inductor.

14. The method according to claim 11, wherein the step of measuring current through the power inductor comprises the step of measuring current with a current sense transformer in a main current path of the SMPS.

15. The method according to claim 11, wherein the step of measuring current through the power inductor comprises the step of measuring voltage drop across an upper MOSFET switch used as the at least one power switch.

16. The method according to claim 11, wherein the step of measuring current through the power inductor comprises the step of measuring current with an auxiliary winding on the power inductor.

17. The method according to claim 11, wherein the step of measuring current through the power inductor comprises the step of measuring current with a matching complementary filter.

* * * * *